US012606078B2

(12) United States Patent
Hartle

(10) Patent No.: US 12,606,078 B2
(45) Date of Patent: Apr. 21, 2026

(54) COST-EFFECTIVE TRUCK BED CAMPER

(71) Applicant: Chase Hartle, Lexington, TN (US)

(72) Inventor: Chase Hartle, Lexington, TN (US)

( * ) Notice: Subject to any disclaimer, the term of this patent is extended or adjusted under 35 U.S.C. 154(b) by 377 days.

(21) Appl. No.: 18/495,416

(22) Filed: Oct. 26, 2023

(65) Prior Publication Data

US 2025/0135984 A1    May 1, 2025

(51) Int. Cl.
B60P 3/32        (2006.01)
B60R 9/06        (2006.01)

(52) U.S. Cl.
CPC ................ B60P 3/32 (2013.01); B60R 9/065 (2013.01)

(58) Field of Classification Search
CPC ................................... B60P 3/32; B60R 9/065
See application file for complete search history.

(56) References Cited

U.S. PATENT DOCUMENTS

| | | | | | |
|---|---|---|---|---|---|
| 3,879,240 | A | * | 4/1975 | Wall | B60P 3/32 264/46.7 |
| 4,310,194 | A | * | 1/1982 | Biller | B60P 3/32 296/26.02 |
| 5,141,197 | A | * | 8/1992 | Mackaay | B60P 3/32 280/765.1 |
| 7,722,110 | B2 | * | 5/2010 | McCarthy | B60P 3/32 296/156 |
| 11,752,917 | B2 | * | 9/2023 | Barnhart | E04H 15/14 296/164 |
| 12,221,275 | B2 | * | 2/2025 | Eitschberger | B65D 21/083 |
| 2017/0066361 | A1 | * | 3/2017 | Ahn | B60P 3/32 |
| 2023/0322147 | A1 | * | 10/2023 | Littlefield | B62D 29/043 |

* cited by examiner

*Primary Examiner* — Faye M Fleming
(74) *Attorney, Agent, or Firm* — Intellectual Property Consulting, LLC; Jared K. Rovira

(57) ABSTRACT
The present invention is a camper configured to fit in the bed of a truck. The camper is made with an external frame comprised of L-shaped angled metal members which provide structural support and help seal the joints between sections of the camper walls. The camper walls are comprised of honeycomb material which function as both walls and insulation. The novel combination of these materials allows for the functions of many elements to be achieved by only two components.

20 Claims, 7 Drawing Sheets

102

104

102

104

COST-EFFECTIVE TRUCK BED CAMPER

BACKGROUND OF THE INVENTION

I. Field of the Invention

The present invention relates generally to the manufacture of campers for truck beds.

II. General Background

The current methods of manufacturing vehicle-based shelters, commonly called campers, require many types of material and process steps. For example, current manufacturing methods of camper shells can require a wooden/metal frame, insulation, walls, sealant strips/material and multiple forms of adhesive/fastener between each of these components. This leads to a costly final product, even for small, simpler camper models. The high cost of campers can be prohibitive for many consumers, thus there is a need for a more cost-efficient manufacturing process in the camper industry.

SUMMARY OF THE INVENTION

In accordance with one embodiment, the present invention is a truck camper with an external frame made of L-shaped angled metal members which provide structural support, help seal the joints between sections of camper wall and trim the external portion of the camper. The camper walls are comprised of honeycomb material, which functions as both structural walls and insulation. The novel combination of these materials allows for the functions of many elements to be achieved by only two components and thereby greatly reduces the time and cost of manufacturing a camper.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

Figure 1:
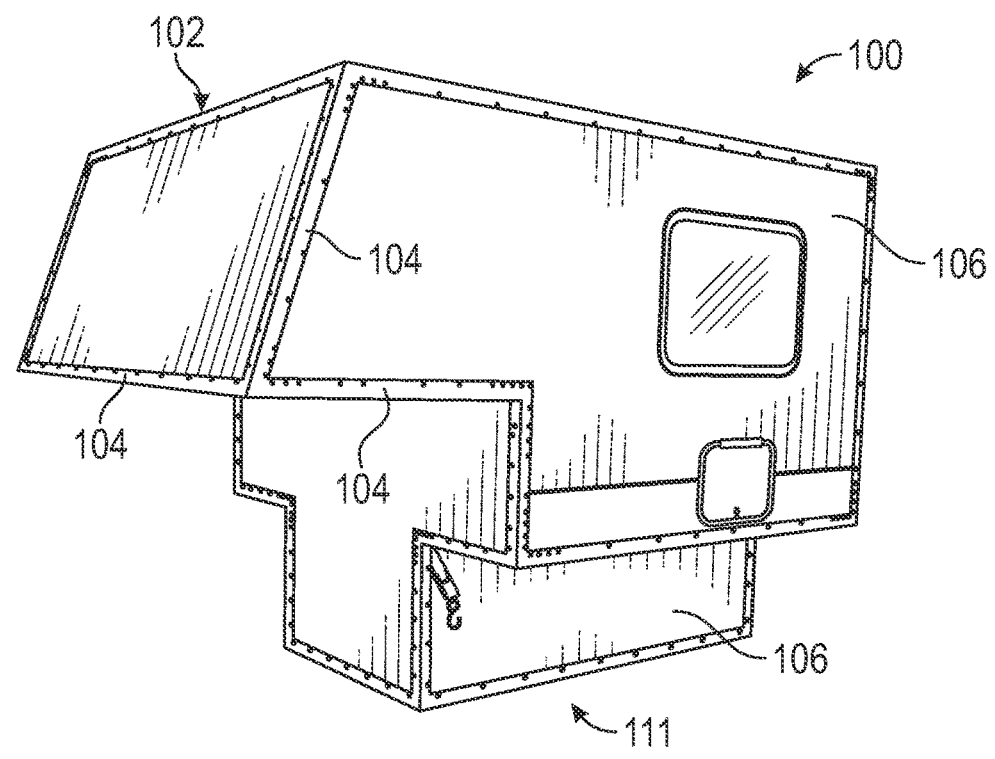
FIG. 1 depicts an angled view of a camper comprising an external metal frame and walls made from honeycomb material in accordance with an embodiment of the invention.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

The embodiments of the disclosure will be best understood by reference to the Figures, wherein like parts are designated by like numerals throughout. It will be readily understood that the components, as generally described and illustrated in the Figures herein, could be arranged and designed in a wide variety of different configurations or be entirely separate. Thus, the following more detailed description of the embodiments of the device of the disclosure as represented in the Figures is not intended to limit the scope of the disclosure as claimed, but is merely representative of possible embodiments of the disclosure.

The following description sets forth numerous embodiments and parameters. It should be recognized, however, that such description is not intended as a limitation on the scope of the present invention but is instead provided as a description of exemplary embodiments. Various modifications to the examples described will be readily apparent to those of ordinary skill in the art, and the general principles defined may be applied to other examples and applications without departing from the spirit and scope of the invention. Thus, the present invention is not intended to be limited to the examples described herein but is to be accorded a scope consistent with the claims.

Generally, the invention is a vehicle-based shelter 100, also called a camper, comprising an external skeletal frame 102 made of L-shaped metal members 104 and walls 106 attached to the interior corners 108 of the external skeletal frame. The L-shaped metal members are made from structural metal to provide a load bearing structure of the camper. The walls 106 of camper 100 are made of panels of honeycomb material 110. The bottom of shelter 111 may be sized and shaped to fit in the bed of a pickup truck.

Figure 2:
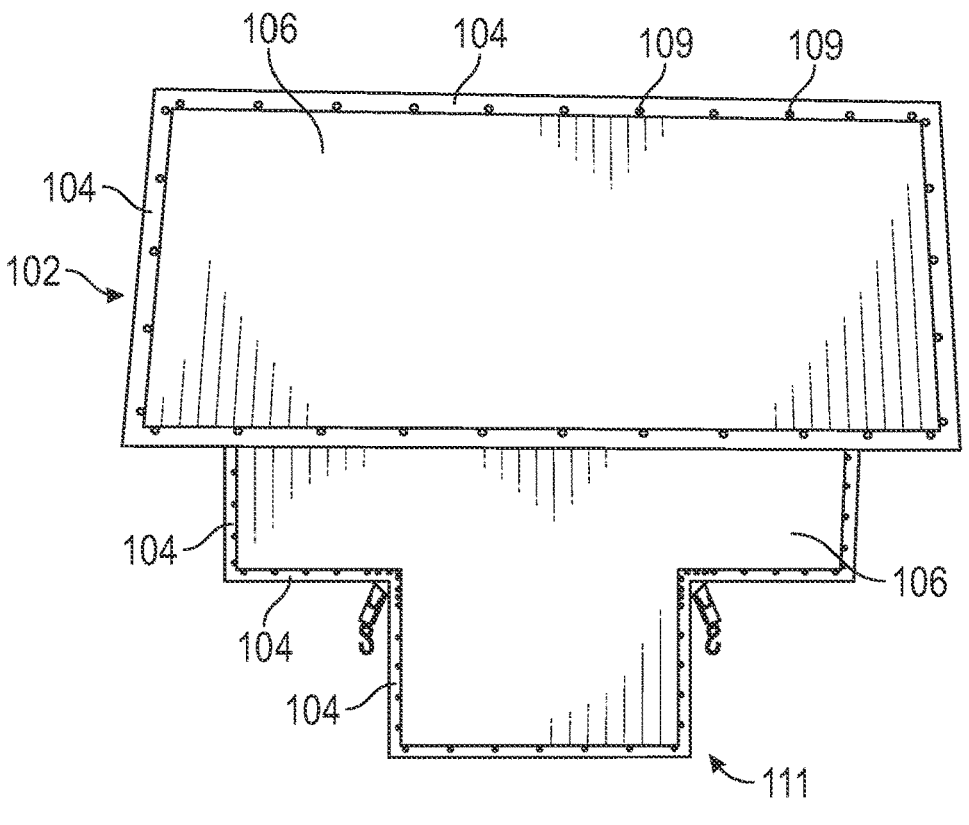
FIG. 2 depicts a front view of a camper comprising an external metal frame and walls made from honeycomb material in accordance with an embodiment of the invention.
Figure 3:
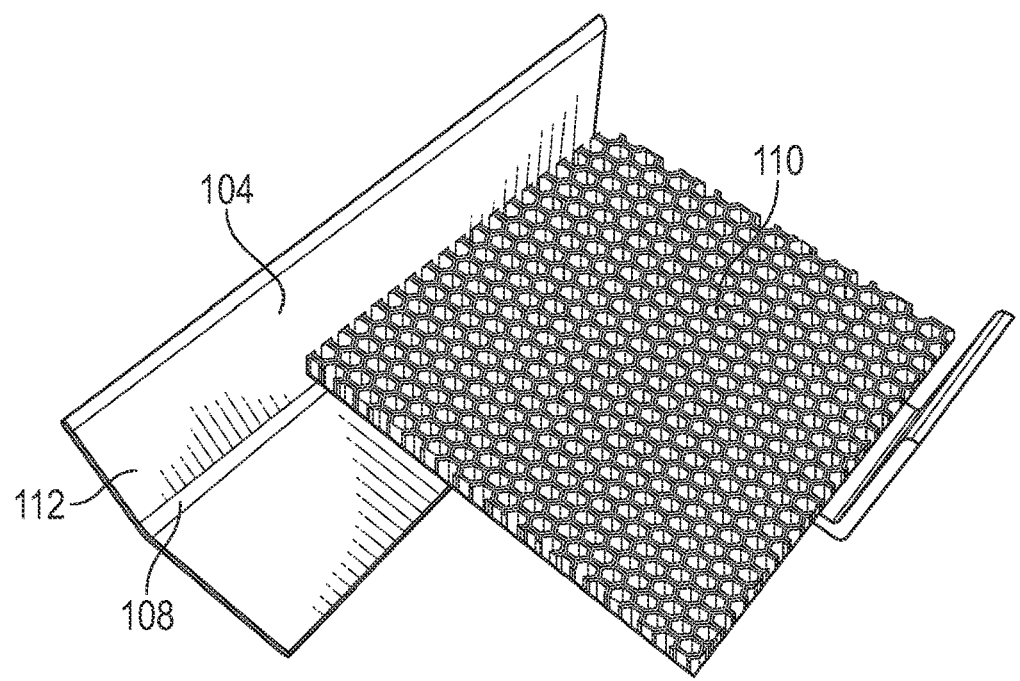
FIG. 3 depicts a back view of a cutout of an external metal frame with a piece of honeycomb material attached in accordance with an embodiment of the invention.
Figure 4:
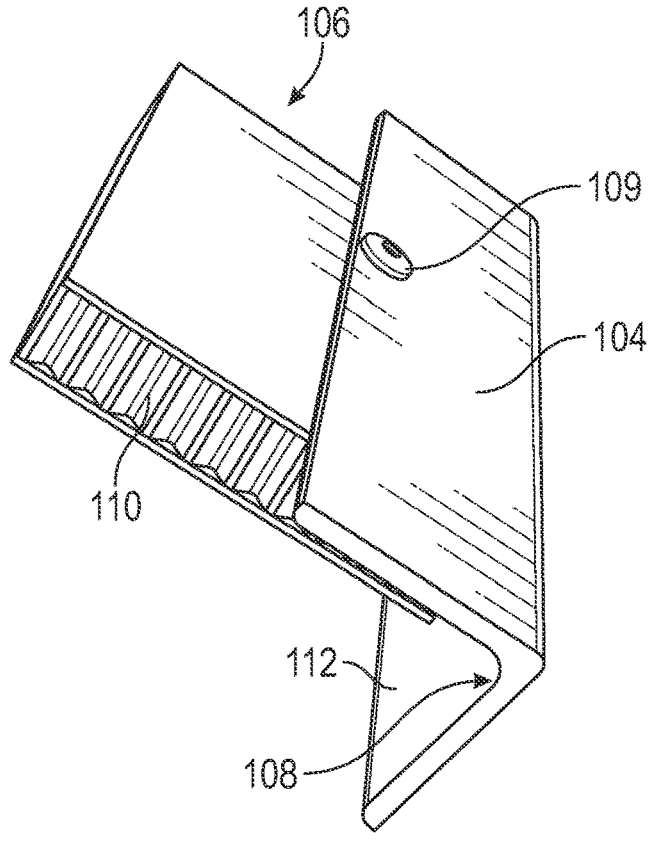
FIG. 4 depicts an angled view of a cutout of an external metal frame with a piece of honeycomb material attached in accordance with an embodiment of the invention.
Figure 5:
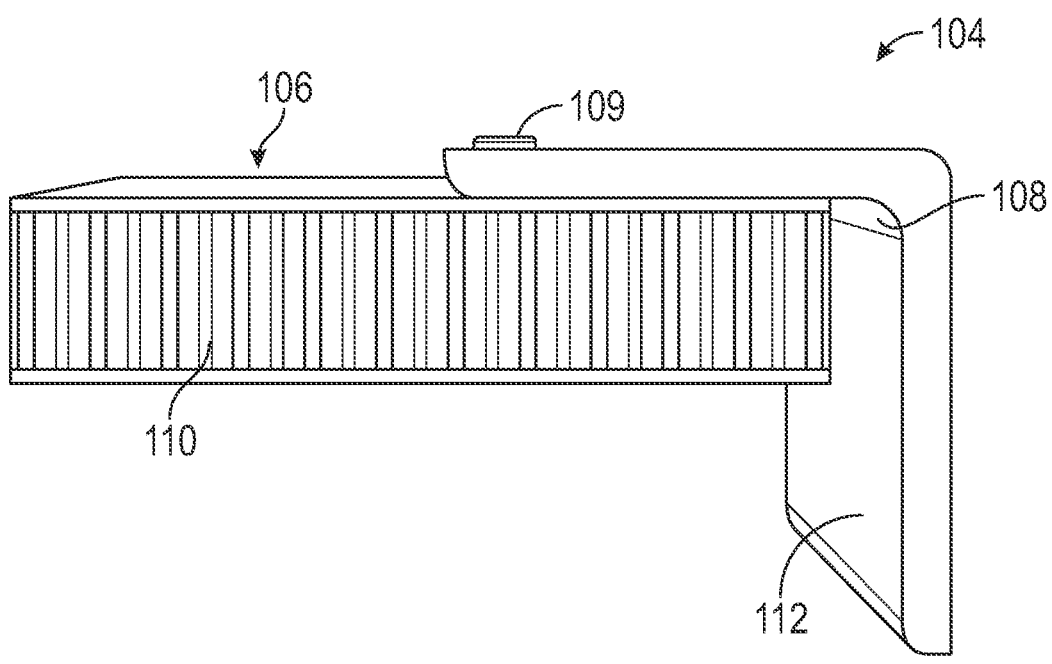
FIG. 5 depicts a side view of a cutout of an external metal frame with a piece of honeycomb material attached in accordance with an embodiment of the invention.
Figure 6:
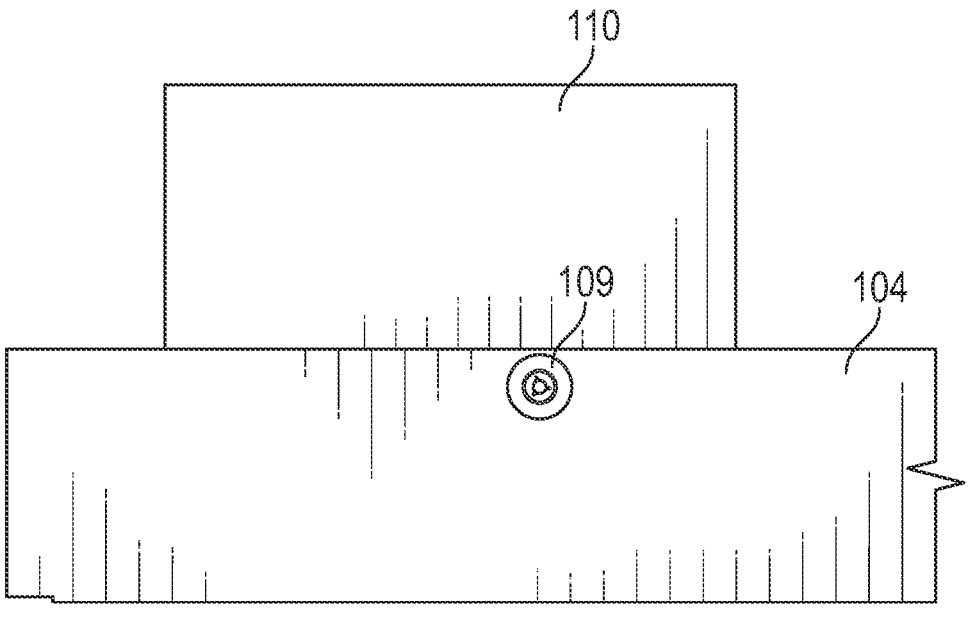
FIG. 6 depicts a front view of a cutout of an external metal frame with a piece of honeycomb material attached in accordance with an embodiment of the invention.
Figure 7:
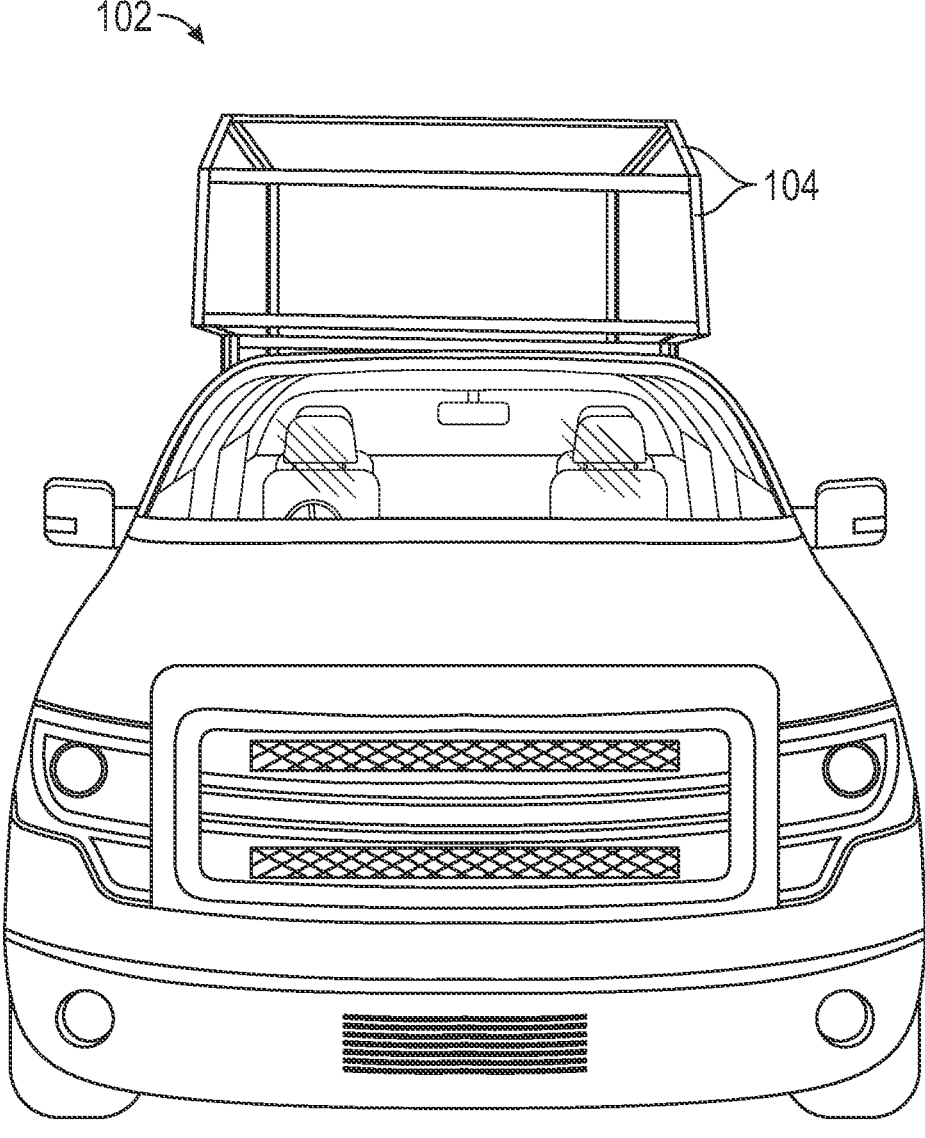
FIG. 7 depicts a front view of a truck having a shelter's external metal frame in the bed of the truck in accordance with an embodiment of the invention.
Figure 8:
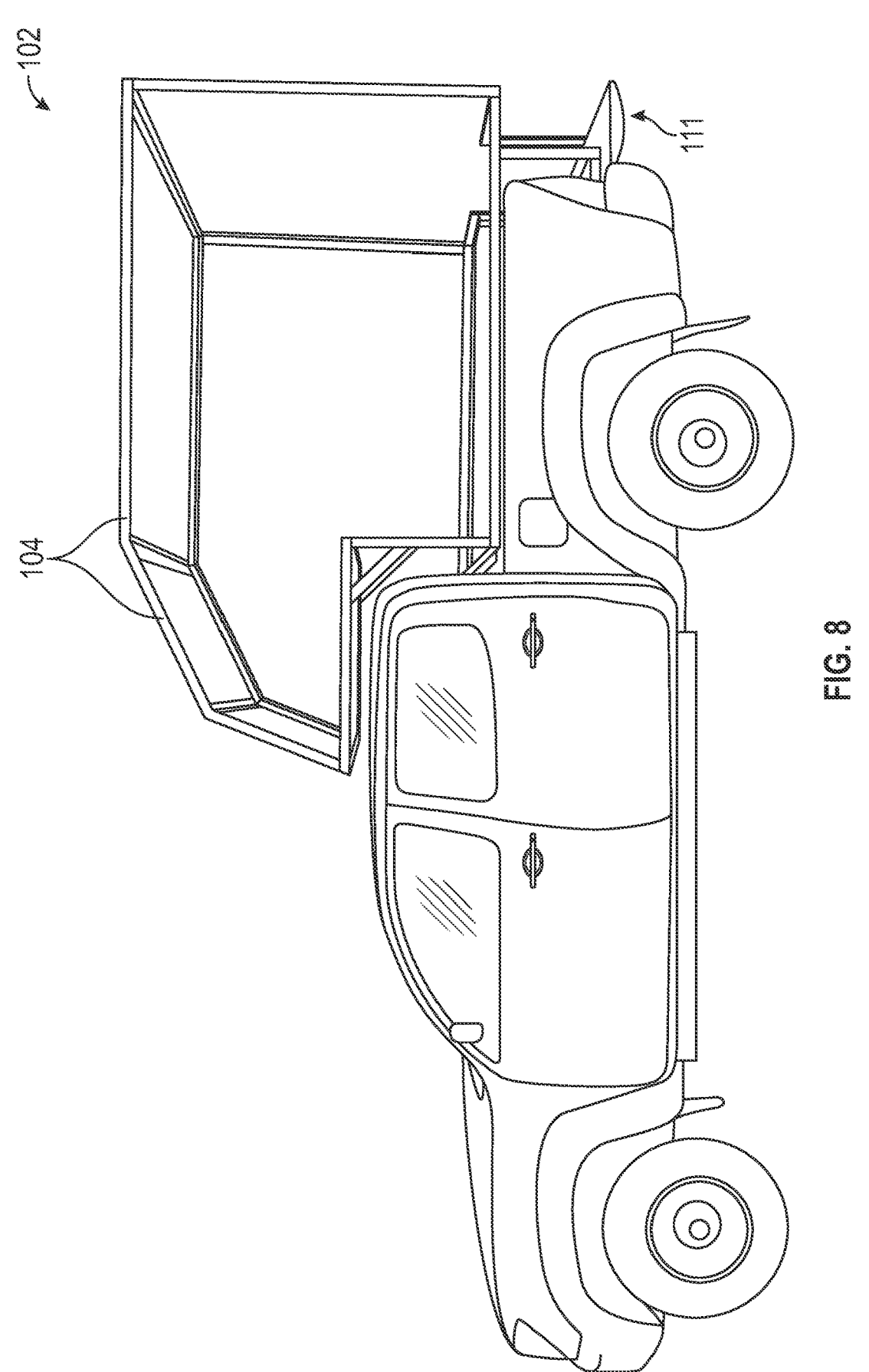
FIG. 8 depicts a side view of a truck having a shelter's external metal frame in the bed of the truck in accordance with an embodiment of the invention.
Figure 9:
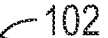
FIG. 9 depicts a back view of a truck having a shelter's external metal frame in the bed of the truck with tailgate down in accordance with an embodiment of the invention.
Figure 10:
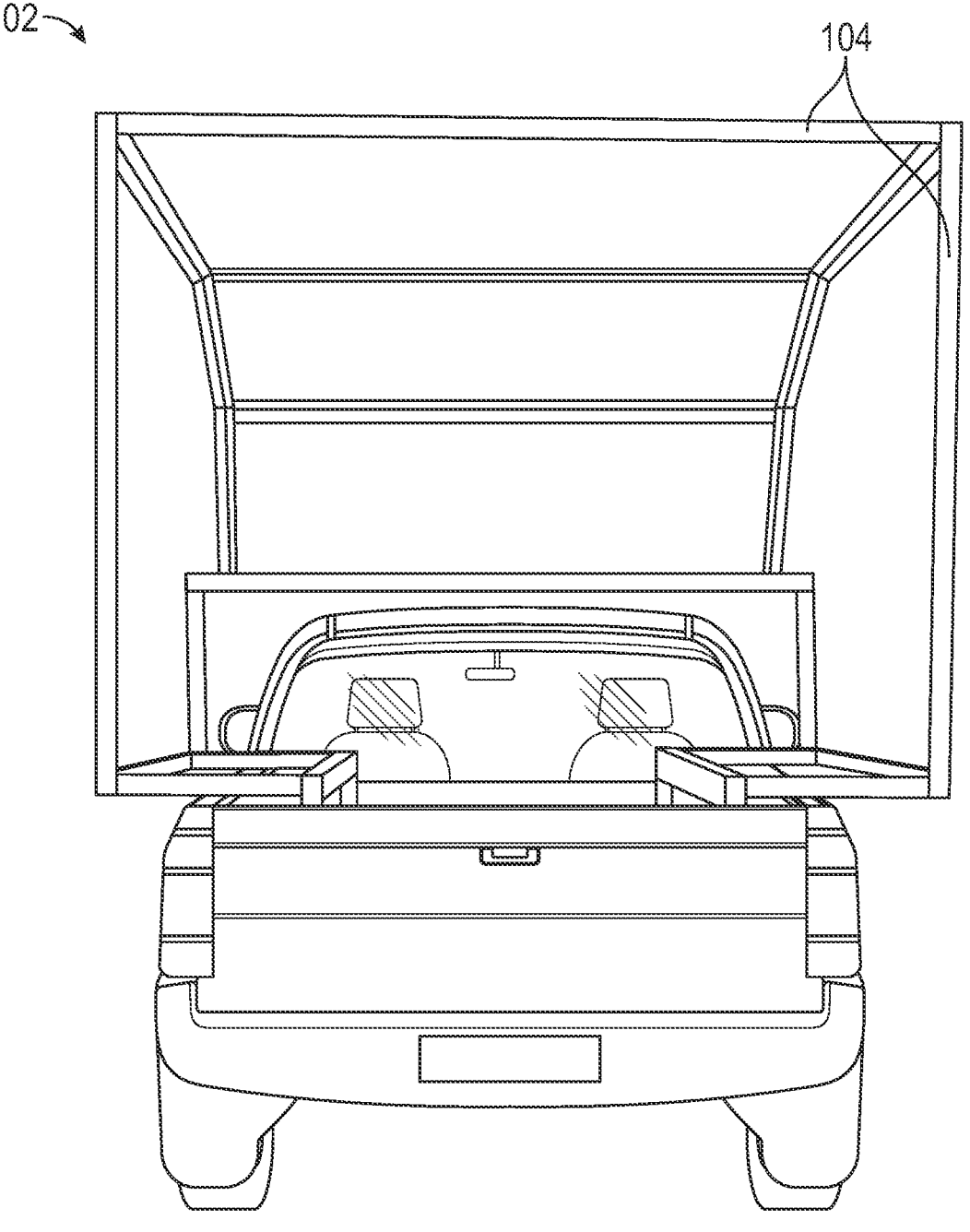
FIG. 10 depicts a back view of a truck having a shelter's external metal frame in the bed of the truck with tailgate up in accordance with an embodiment of the invention.

Referring to FIGS. 1-2, some embodiments of the present invention may be a camper 100 sized and shaped to fit into the bed of a pickup truck. FIG. 1 displays a camper 100 with external metal frame 102 and the walls 106 fully secured to the interior corners of the L-shaped members 104 of the frame by rivets 109. Walls 106 may be attached to the external metal frame by any suitable means, for example, fasteners, adhesive, welding, crimping, etc. In some embodiments, the walls 106 may be attached only to the metal frame members 104. In some embodiments, walls 106 may be directly attached to both the metal frame members 104 and the other walls 106. The walls 106 may be joined to other wall panels 106 through use of fasteners, adhesive, welding, crimping, etc. In some embodiments, the walls provide further structural support for the shelter in addition to the metal external frame 102.

Referring to FIGS. 3-6, some embodiments of the present invention rely on the combination of L-shaped metal members 104 and walls 106 made of honeycomb panels 110 in order to consolidate the functions of the many components used in standard camper manufacturing. As shown in FIGS. 3-6, the monolithic L-shape corner of the metal members 104 sit over the joints of adjoining walls, floor and roof pieces, thereby providing a seal for the joints and protecting the camper from moisture and/or wind intrusion. Additionally, sealants such as caulk or silicone may be added to the joints. The metal members 104 provide the additional benefit of aesthetic trimming for the external camper shell. The metal members may be made of any metal suitable for structural load bearing, such as appropriate grades of aluminum, steel, iron or a suitable metal alloy.

The walls of the shelter are made of panels of honeycomb material. The honeycomb material is not only a rigid structural material suitable to protect against rain, sleet, snow, wind, etc., but it also provides insulation. The honeycomb material is a sandwiched thermoplastic material wherein the honeycombs are filled with another material and thus provide an insulating layer. The honeycombs may be filled with air, aluminum, fiberglass, plastic or any other suitable insulating material in order to provide different insulation properties.

The L-shape of the metal members effectively provides a template for receiving and securing a section of wall or wall panel. Once a wall or wall panel is placed into the corresponding section of metal frame, the portion of the L-shaped metal member that is perpendicular 112 to the plane of the wall 106 provides a lip that helps secure the section of wall in place. Once the wall is placed in the interior of the frame, the portion of the L-shaped metal member that is perpendicular 112 to the plane defined by a wall 106 abuts the edge of the wall panel on all sides and prevents the wall section 106 from being rotated in a planar direction as defined by the plane of the wall. Likewise, the portion of the L-shaped metal member that is perpendicular 112 to the plane of the wall prevents the wall panel from being translationally moved in the longitudinal or latitudinal direction of the wall. Thus, the L-shape of the metal members functions to receive a section of wall panel and hold the section of wall in place. This feature allows for simplified construction of the camper shelters by a single builder.

FIGS. 7-10 show the external metal frame 102 placed in the bed of a pickup truck before walls 106 have been added to the frame 102. In constructing the external frame, the plurality of L-shaped metal members 104 may be secured to one another via any means suitable for construction of shelters, such as welding, fasteners, adhesive and/or crimping. The external frames may be built directly in the bed of a truck, or the frames may be built independently and placed and secured in the bed of a truck at a later time. Yet another embodiment allows the frame and walls of the shelter to first be built and then installed, or the entire camper may be built and then installed onto a truck bed.

The method described below may be modified to remove any number of steps and is still in accordance with the embodiments of this invention.

The invention described above and in the figures is created through a novel method 300 of manufacturing a cost-efficient vehicle-based shelter. The first step 310 of method 300 requires creating an external frame configured to fit in the back of a truck using L-shaped angled metal members.

The next step 320 involves attaching panels of honeycomb material to the interior corners of the metal skeletal frame to create walls. The panels of honeycomb material may be attached by fasteners, adhesive, welding, crimping or any other suitable method.

Method 300 may include the further step of placing the frame in the bed of a truck and securing the frame to the truck. Alternatively, the frame may be secured to the truck as part of step 310, during construction of the frame, before the walls are attached to the frame in step 320.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A vehicle-based shelter comprising:
   an external skeletal frame comprising a plurality of L-shaped metal members attached to one another, wherein the external skeletal frame forms a portion of an exterior of the shelter;
   walls attached to the interior of the skeletal frame, wherein the walls comprise wall panels of honeycomb material, and wherein edges of the wall panels are secured within interior corners formed by the L-shaped metal members;
   wherein the L-shaped metal members are exterior to the wall panels.

2. The device of claim 1, wherein a portion of each L-shaped metal member abuts an edge of the wall panel on all sides of the wall panel.

3. The device of claim 1, the L-shape of the metal members provides a lip that prevents the walls from being rotated in the planar direction defined by the wall.

4. The device of claim 1, the L-shape of the metal members provides a lip that prevents the walls from being translationally moved in the longitudinal or latitudinal direction of the plane defined by the wall.

5. The device of claim 1, the L-shape of the metal members provides a template for receiving a corresponding section of wall.

6. The device of claim 1, wherein a bottom portion of the shelter is configured to fit in the bed of a pickup truck.

7. The device of claim 1, wherein the L-shaped angled metal members are attached to one another by welds.

8. The device of claim 1, wherein the metal is aluminum.

9. The device of claim 1, external skeletal frame comprising L-shaped metal members is the primary load bearing structure of the shelter.

10. The device of claim 1, wherein the honeycomb material is a thermoplastic sandwich material comprising a honeycomb core filled with an insulating material.

11. The device of claim 1, wherein the walls are configured to provide load bearing support.

12. A method of manufacturing a frame and walls of a vehicle-based shelter comprising:

creating an external frame configured to fit in the back of a truck using a plurality of L-shaped angled metal members attached to one another, wherein the external frame forms a portion of an exterior of the shelter;

attaching wall panels of honeycomb material to the interior of the metal skeletal frame to create walls, wherein edges of the panels are secured within interior corners formed by the L-shaped metal members;

wherein the L-shaped metal members are exterior to the wall panels.

13. The method of claim 12, wherein a portion of each L-shaped metal member abuts an edge of the corresponding wall panel on all sides of the corresponding wall panel.

14. The method of claim 12, the L-shape of the metal members provides a lip that prevents the walls from being rotated in the planar direction defined by the wall.

15. The method of claim 12, the L-shape of the metal members provides a lip that prevents the walls from being translationally moved in the longitudinal or latitudinal direction of the plane defined by the wall.

16. The method of claim 12, the L-shape of the metal members provides a template for receiving a corresponding section of wall.

17. The method of claim 12, wherein a bottom portion of the shelter is configured to fit in the bed of a pickup truck.

18. The method of claim 12, wherein the L-shaped angled metal members are attached to one another by welds.

19. The method of claim 12, wherein the metal is aluminum.

20. The method of claim 12, wherein the honeycomb material is a thermoplastic sandwich material comprising a honeycomb core filled with an insulating material.

* * * * *